United States Patent
Thiebot et al.

(10) Patent No.: US 12,541,248 B2
(45) Date of Patent: Feb. 3, 2026

(54) METHOD FOR IMAGING A BODY PART OF A USER, METHOD FOR PREVENTING REPLAY OF A MOVEMENT OF A BODY PART, AND ASSOCIATED COMPUTER PROGRAM PRODUCT

(71) Applicant: IDEMIA IDENTITY & SECURITY FRANCE, Courbevoie (FR)

(72) Inventors: Alain Thiebot, Courbevoie (FR); Jean Beaudet, Courbevoie (FR); Julien Doublet, Courbevoie (FR); Joël Yann Fourre, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 23 days.

(21) Appl. No.: 18/693,975

(22) PCT Filed: Aug. 1, 2022

(86) PCT No.: PCT/EP2022/071571
§ 371 (c)(1),
(2) Date: Mar. 21, 2024

(87) PCT Pub. No.: WO2023/046344
PCT Pub. Date: Mar. 30, 2023

(65) Prior Publication Data
US 2024/0393871 A1    Nov. 28, 2024

(30) Foreign Application Priority Data
Sep. 27, 2021  (FR) ...................................... 21 10177

(51) Int. Cl.
*G06F 3/01*        (2006.01)
*G06F 21/32*       (2013.01)
(Continued)

(52) U.S. Cl.
CPC .............. *G06F 3/012* (2013.01); *G06F 21/32* (2013.01); *G06V 40/165* (2022.01); *G06V 40/45* (2022.01)

(58) Field of Classification Search
CPC .......... G06F 21/32; G06F 3/012; G06F 3/017; G06T 7/70; G06T 3/02; G06V 20/40;
(Continued)

(56) References Cited

U.S. PATENT DOCUMENTS 11,507,646 B1 * 11/2022 Baldwin ................ G06V 40/40
2003/0072474 A1 *  4/2003 Kies ..................... G06V 40/161
                                                   348/E7.079
(Continued)

OTHER PUBLICATIONS

International Search Report issued Nov. 9, 2022 in PCT/EP2022/071571, filed on Aug. 1, 2022, 2 pages.
(Continued)

*Primary Examiner* — Hong Zhou
(74) *Attorney, Agent, or Firm* — Oblon, McClelland, Maier & Neustadt, L.L.P.

(57) ABSTRACT

The invention relates to a method for imaging a body part of a user according to a predetermined positioning instruction, comprising the following steps:
- a first step of acquiring a first image,
- a step of characterizing, in said first image, a first position of the body part,
- a step of determining a second position of the body part,
- a processing step in which doctored video feedback of the body part is displayed to the user so as to generate a self-correction by the user of the positioning of said body part according to the predetermined positioning instruction,
- a second step of acquiring a second image, during the processing step.

16 Claims, 10 Drawing Sheets

(51) Int. Cl.
*G06V 40/16* (2022.01)
*G06V 40/40* (2022.01)

(58) Field of Classification Search
CPC .... G06V 40/165; G06V 40/161; G06V 40/45; G06V 40/67
See application file for complete search history.

(56) References Cited

U.S. PATENT DOCUMENTS

| 2013/0015946 A1* | 1/2013 | Lau ..................... G06V 40/172 340/5.2 |
| 2016/0063235 A1* | 3/2016 | Tussy ..................... G06V 40/70 726/6 |
| 2020/0296132 A1 | 9/2020 | Lv et al. |

OTHER PUBLICATIONS

French Preliminary Search Report & Written Opinion issued May 2, 2022 in FR application 21 10177, filed on Sep. 27, 2021, 11 pages (with English Translation of Categories of Cited Documents).

\* cited by examiner

METHOD FOR IMAGING A BODY PART OF A USER, METHOD FOR PREVENTING REPLAY OF A MOVEMENT OF A BODY PART, AND ASSOCIATED COMPUTER PROGRAM PRODUCT

The invention relates to the field of methods and electronic devices for imaging a body part of a user, in particular a face, one or more irises, a hand or a finger, for applications requiring construction of a three-dimensional model or with a view to authenticating said user, for example to verify his right to access to a good or service or a geographical zone, and/or with a view to verifying that the user is real, alive and legitimate.

Imaging devices for constructing a three-dimensional model or achieving authentication that require the user to present a body part in a plurality of positions are known in the prior art. These devices for example display on a display screen a model to be followed by the user. According to one known embodiment, the face of a robot that tilts its head upwards and downwards then left to right is displayed on a screen. The user must reproduce in front of the electronic imaging device the same head movements as the robot.

The methods implemented by these devices are not intuitive to the user, who may find it tedious and laborious to have to follow a target or reproduce movements to register in a database or to access a zone or service after registering. It is also common for users who are not familiar with such electronic products to not at all understand the instructions to follow. When the movements to be reproduced are always the same, the imaging device may be deceived by replay of a recording of a previous use.

According to another example, it is known to display, on a display screen of an electronic imaging device, a target that the user must follow with his eyes and/or head.

It is also known to display, on a display screen, a face-outline template that moves over the display screen and/or is of variable size. The user must move his head with respect to the display screen and/or move towards or away from it so that his face remains inscribed in the displayed face-outline template.

These imaging devices encourage the user to move and make it possible, for example, to verify that the user is a living person and that a photograph has not been placed in front of the electronic imaging device. Specifically, such imaging devices may be used to authenticate a legitimate user or to verify a right to access a good or service or a geographical zone.

The methods implemented by these devices are not intuitive to the user, who may find it tedious and laborious to have to follow a target to prove his legitimacy. A legitimate user may even find it annoying to have to prove his legitimacy to an electronic device, or not understand what movement to make.

Some devices comprise a plurality of cameras so as to be able to image a body part in three dimensions, for example a fingertip from various viewing angles in order to image a complete fingerprint, or a hand in order to image both the palm of the hand and the ulnar side of the hand.

Such devices are expensive and bulky because of the plurality of integrated cameras.

The aim of the invention is to solve the aforementioned problems of the prior art by providing an imaging method that is not only intuitive to and trustable by the user, and pleasant to use, but that also does not put the user out. The invention further allows reliable and discreet verification of the legitimacy of a user through implementation of a reliable anti-replay method that is hardly perceptible to the user.

The invention relates to a method for imaging a body part of a user according to a predetermined positioning instruction by means of a system comprising a computer and an electronic device comprising a video-capturing device able to acquire images of said body part of the user and a display screen, the method comprising the following steps:

a first step of acquiring, by means of the video-capturing device, a first image containing said body part of the user, a step of characterizing, in said first image, by means of the computer, a first position of the body part of the user, a step of determining, by means of the computer, a second position of said body part of the user different from the first position, a processing step in which the computer retrieves a video stream of images acquired by the video-capturing device and containing said body part, generates modified images as the images of said video stream are acquired by modifying, in the acquired images, the positioning of the body part, with a view to displaying, on the display screen, doctored video feedback corresponding to said modified images, so as to engender a self-correction by the user of the positioning of said body part according to said predetermined positioning instruction, the modification of the images being such that a position of said body part according to said predetermined positioning instruction on the display screen corresponds to a position of the body part according to said second position in an image acquired by the video-capturing device, and so that the movement of the body part in the doctored video feedback is consistent with the change in positioning of the body part in the acquired images, a movement of the body part with respect to the electronic device in a direction engendering a movement of the body part in the same direction in the doctored video feedback, a second step of acquiring, by means of the video-capturing device, a second image containing said body part of the user, during the processing step.

According to one aspect of the invention, the first image is saved in a memory of the electronic device.

According to one aspect of the invention, the second image is saved in a memory of the electronic device.

According to one aspect of the invention, the position of said body part in the second image is different from the second position.

According to one aspect of the invention, the processing step terminates following acquisition of the second image in the second acquiring step.

According to one aspect of the invention, the second acquiring step comprises acquiring a plurality of second images by means of the video-capturing device, the position of the body part in each second image being different.

Thus, all of the positions of the body part in the second images are different from one another.

According to one aspect of the invention, the plurality of second images is saved in a memory of the electronic device.

According to one aspect of the invention, the processing step terminates when the position of said body part in the second image corresponds to a predetermined third position different from the second position.

According to one aspect of the invention, the processing step terminates when the number of second images exceeds a predetermined threshold.

According to one aspect of the invention, the second position is reached by enlarging or decreasing the size of the body part in the first image, i.e. through a change in positioning of said body part from the first position and according to said predetermined positioning instruction corresponding to a movement of the body part towards or away from the video-capturing device.

According to one aspect of the invention, the second position is reached by decentring said body part in the first image, i.e. through a change in positioning of said body part from the first position and according to said predetermined positioning instruction corresponding to a movement of the body part vis-à-vis the video-capturing device in a plane orthogonal to a line of sight of said video-capturing device.

The line of sight corresponds to an optical axis of the video-capturing device.

According to one aspect of the invention, the second position is reached by rotating said body part in the first image, i.e. through a change in positioning of said body part from the first position and according to said predetermined positioning instruction corresponding to a rotary movement of the body part vis-à-vis the video-capturing device.

According to one aspect of the invention, the second position results from a transformation consisting of one or a combination of:
enlarging or decreasing the size of the body part in the first image,
decentring said body part in the first image,
rotating said body part in the first image.

For example, a transformation may be a combination of enlarging and decentring.

According to one aspect of the invention, the predetermined instruction regarding positioning of said body part of the user comprises displaying on the display screen, in superposition, a positioning target the location and size of which are set with respect to said display screen.

According to one aspect of the invention, the second position is determined depending on an instruction from an anti-fraud device and/or from a device for performing three-dimensional modelling and/or from a device for constructing biometric data.

An anti-fraud device makes it possible to verify that a user is not attempting to commit fraud, and in particular that the body part of the user to be imaged is alive and real, by verifying in images, for example, details of the skin, that an environment of said body part remains consistent, and/or the three-dimensional visibility of said body part in order to detect fraud of a planar nature.

The environment of the body part encompasses the interface between the body part and the environment, and the more distant environment displayed on the display screen.

For example, an environment is inconsistent if the body part and the environment have unexpected proportions following movement of the body part. According to one aspect of the invention, the second position is determined depending on a random or pseudo-random datum.

According to one aspect of the invention, said body part is of a defined category, the second position being determined depending on the category of said body part.

According to one aspect of the invention, the first acquiring step, the characterizing step, the determining step, the processing step, and the second acquiring step are iterated a plurality of times.

According to one aspect of the invention, the second position of an iteration of the imaging method is determined depending on the second position in the preceding iteration of the imaging method, or on a history of the second positions in preceding iterations of the imaging method.

According to one aspect of the invention, the second position of an iteration of the imaging method is determined depending on the position of said body part in the second image or in a predetermined second image of a plurality of second images of the second acquiring step in the preceding iteration of the imaging method, or on a history of the positions of said body part in the second image or in a predetermined second image of a plurality of second images of the second acquiring step of preceding iterations of the 30 imaging method.

According to one aspect of the invention, the position of said body part in the second predetermined image corresponds to the third position.

According to one aspect of the invention, the number of iterations is dependent on an instruction from an anti-fraud device and/or from a device for performing three-dimensional modelling and/or from a device for constructing biometric data.

According to one aspect of the invention, the number of iterations is dependent on the elapse of a predetermined length of time.

According to one aspect of the invention, the video-capturing device is able to acquire images of biometric prints of said body part of the user, the first image and at least one second image being images of biometric prints.

An image of a biometric print is for example an image of a network of ridges and/or valleys of the skin, of a hand, of a finger or of a face or of patterns of an iris, that is taken with a view to authenticating a user by comparing their shape, characteristics and/or colour to a reference model stored in a database.

According to one aspect of the invention, said body part is a face.

According to one aspect of the invention, said body part is a hand, and in particular a palm of a hand.

According to one aspect of the invention, said body part is a segment of a hand, in particular a finger or a fingertip.

According to one aspect of the invention, said body part is an iris or both irises of a face.

The invention also relates to an anti-replay method, for preventing replay of a movement of a body part, comprising a method for imaging said body part, the anti-replay method comprising a step of verifying, by means of the computer, whether a self-correction by the user of the positioning of said body part of the user is consistent with said predetermined positioning instruction during the processing step, by verifying that a change in the position of the body part in the plurality of second images is consistent with the first position and the second position.

The consistency of the change in the position of the body part makes it possible to verify that the user is a real person who self-corrects the positioning of said body part depending on what is displayed on the display screen and on a positioning instruction, and that the user is not playing, in front of the electronic device, a recorded video of a previous execution of the imaging method or a recorded video with the positioning of said body part changed randomly.

Methods for checking consistency are known in the art and will not be described here.

The invention also relates to a computer program product comprising program instructions implementing the steps of the imaging method, when the program instructions are executed by a computer.

Other advantages and features of the invention will become apparent on reading the description and the drawings.

Figure 1A:
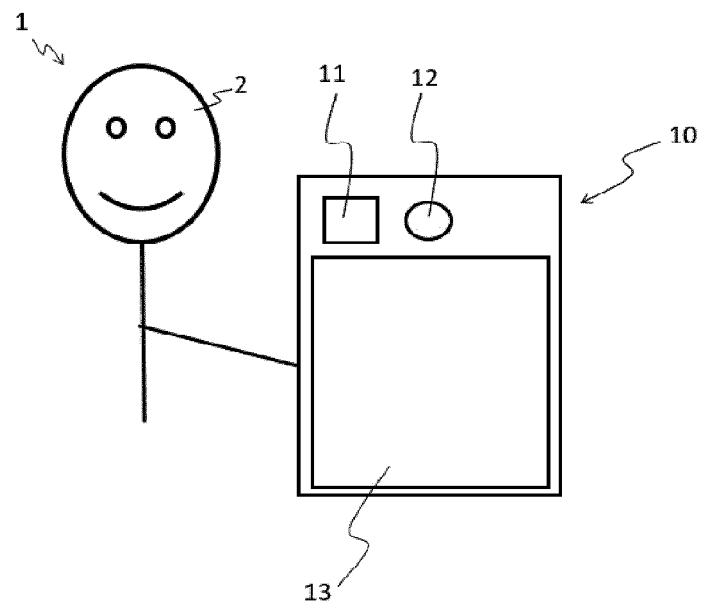
FIG. 1a shows a user holding a mobile electronic device comprising a computer.
Figure 1B:
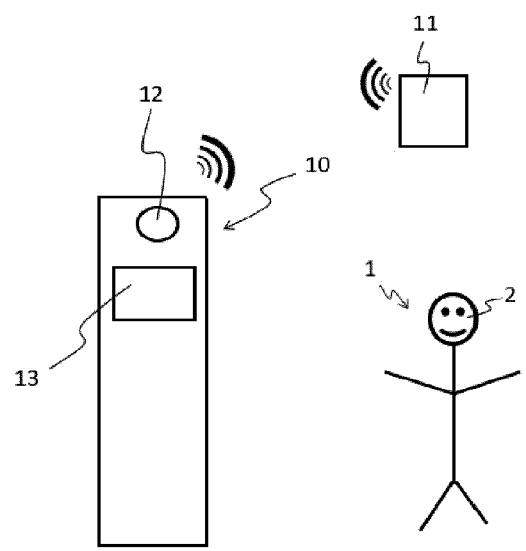
FIG. 1b shows a user in proximity to a fixed electronic device and a computer implemented in a remote server.

FIGS. 1a and 1b show a system comprising a computer 11, and an electronic device 10 comprising a video-capturing device 12 and a display screen 13.

The electronic device 10 may be mobile with respect to the environment of the user 1, i.e. it may be a device such as a mobile telephone as shown in FIG. 1a.

The electronic device 10 may be fixed with respect to the environment of the user 1, and for example placed on the ground, a table or fastened to a wall, i.e. It may be a device such as an acquisition terminal as shown in FIG. 1b.

The computer 11 may be embedded into the electronic device 10, as shown in FIG. 1a, or indeed be remote and embedded in an external server, as shown in FIG. 1b.

Whether the electronic device 10 is fixed or mobile, the computer 11 may be embedded or remote, and FIGS. 1a and 1b are merely examples of system embodiment.

When the computer 11 is remote and embedded in a server, the exchanges of information between the computer 11 and the electronic device are achieved either by contactless transmission means, by radio waves or optical networks for example, or by wired transmission means if the electronic device 10 is not too far from the computer 11.

The video-capturing device 12 is able to acquire images and videos of a body part 2 of a user 1.

The body part 2 of a user is for example a face, one or more fingers of a hand, the palm of a hand, a whole hand, or one or more irises.

The display screen 13 is able to display images taken by the video-capturing device 12, which images may be modified by the computer 11.

Thus, the display screen 13 is able to display undoctored video feedback consisting of a video stream of images acquired by the video-capturing device 12, but it is also able to display doctored video feedback consisting of images acquired by the video-capturing device 12 and then modified by the computer 11.

The invention relates to a method for imaging a body part 2 of a user 1 according to a predetermined positioning instruction.

The user 1 is able to position said part of his body according to a predetermined positioning instruction depending on video feedback displayed on the display screen 13.

If the video feedback on the display screen 13 is undoctored, said body part 2 of the user 1 is positioned with respect to the video-capturing device 12 as displayed on the display screen 13.

If the video feedback on the display screen 13 is doctored, said body part 2 of the user 1 is not positioned with respect to the video-capturing device 12 as displayed on the display screen 13. Advantageously, the user 1 is not informed that the video feedback displayed on the display screen is doctored.

The predetermined positioning instruction may be a voice or visual instruction.

The predetermined positioning instruction may be implicit or explicit.

An implicit predetermined positioning instruction is typically to centre the body part of the user on the display screen 13.

An explicit predetermined positioning instruction for example comprises superposed display of undoctored or doctored video feedback on the display screen 13. According to one preferred example of embodiment, the predetermined positioning instruction comprises displaying on the display screen 13 a positioning target 30 the location and size of which are set with respect to said display screen 13.

Figure 2A:
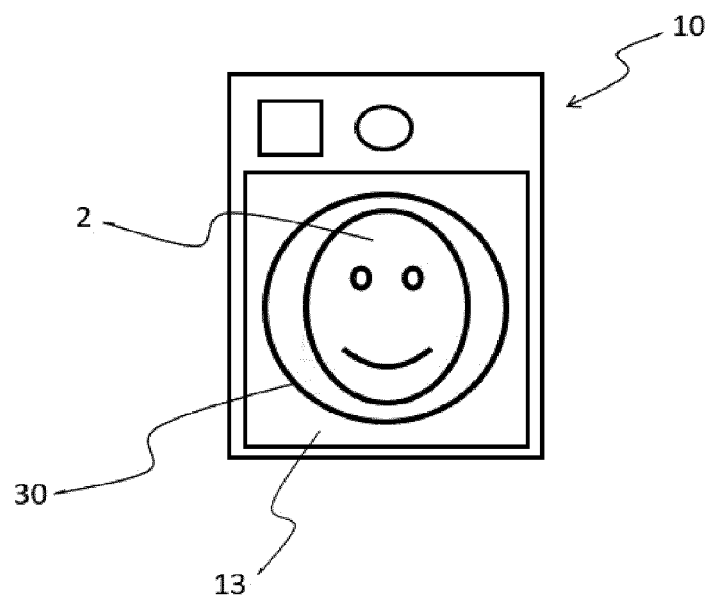
FIG. 2a shows an electronic device comprising a display screen on which a face of a user and a face-outline template are displayed in superposition.

In FIG. 2a, the body part 2 is a face and the target 30 is a face-outline template. According to the predetermined positioning instruction, the user 1 must position his face so as to achieve the best match between the outline of his face and the face-outline template displayed in superposition on the display screen 13.

Figure 2B:
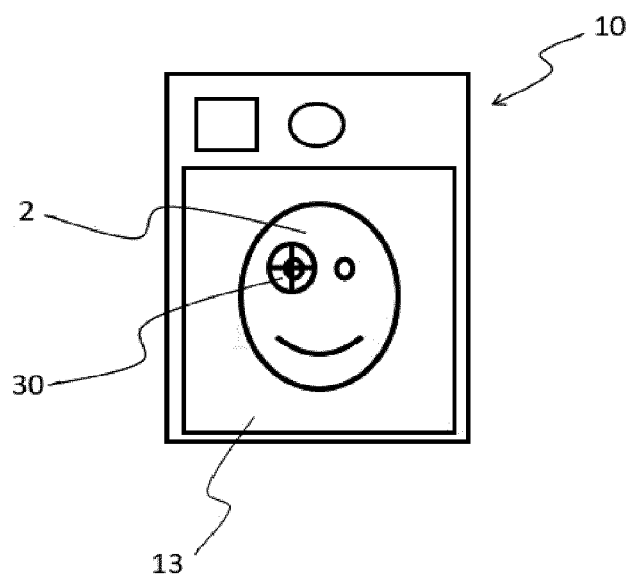
FIG. 2b shows an electronic device comprising a display screen on which a face of a user and a marker are displayed in superposition.

In FIG. 2b, the body part 2 is a face and the target 30 is a marker. According to the predetermined positioning instruction, the user 1 must position his right eye on the marker displayed in superposition on the display screen 13.

The marker and the face-outline template are non-limiting examples of embodiment of a target 30.

Advantageously, the location and size of the target 30 are set with respect to the display screen 13. Thus, whether the video feedback displayed on the display screen 13 is undoctored or doctored, the position and size of the target 30 remain unchanged on the display screen 13.

Advantageously, the predetermined positioning instruction remains the same throughout execution of the imaging method.

Figure 3:
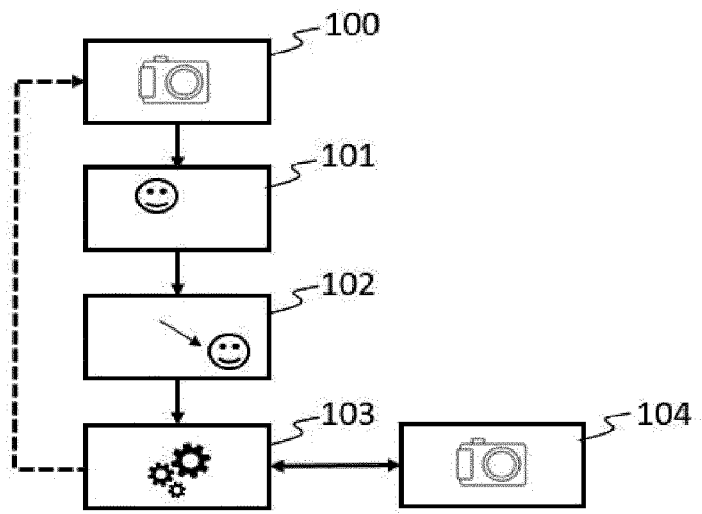
FIG. 3 illustrates the steps of an imaging method according to the invention.
Figure 4:
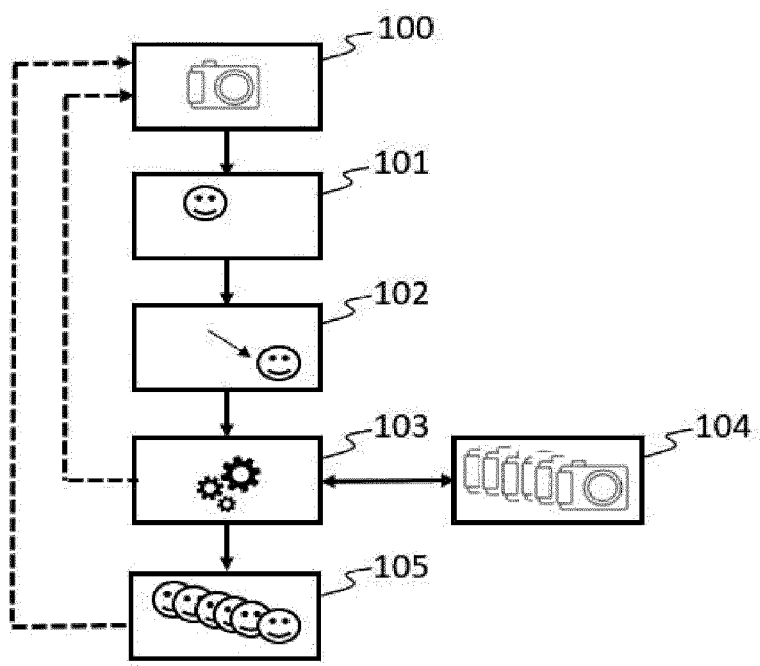
FIG. 4 illustrates the steps of an anti-replay method according to the invention.

The method for imaging a body part 2 of a user 1 comprises a plurality of steps such as shown in FIG. 3.

Preferably, and as described in the description of the method that is given below, the body part is a face. This is non-limiting, the method being applicable to any other body part of a user.

In a first acquiring step 100, the video-capturing device 12 acquires a first image containing said body part 2 of the user.

For example, the video-capturing device 12 acquires images of the body part 2 of the user 1, which are displayed by way of undoctored video feedback on the display screen 13. The user 1 is instructed to position his face according to a predetermined positioning instruction, for example so as to make the outline of his face such as displayed on said video feedback correspond with a fixed face template displayed in superposition on the display screen 13. The video-capturing device 12 acquires a first image containing said body part 2 of the user 1.

Advantageously, the video-capturing device 12 acquires a first image when said body part 2 is positioned according to said predetermined positioning instruction.

However, alternatively, the video-capturing device 12 may acquire a first image containing said body part 2 of the user 1 while said body part 2 is not positioned according to said predetermined positioning instruction, for example because the position of the body part of the part is relevant to the electronic device 10 or because a predetermined period of time has elapsed.

A relevant position is a position in which the associated image is useful for constructing a three-dimensional model, for authenticating said user and/or for verifying the legitimacy of a user.

In a characterizing step 101, the computer 11 characterizes a first position of the body part 2 of the user, in the first image.

A position of a body part may be:
an orientation or posture of the body part in the image,
and/or a location of the body part in the image,
and/or a size of the body part in the image, representing a proximity of the body part to the video-capturing device 12.

According to one example, the computer 11 characterizes the orientation of the body part of the user in the first image. A face of a user may be oriented straight on, at a three-quarters angle, sideways or at another particular angle, and his cephalic posture may be upright, upwards, downwards or at a particular angle to an upright cephalic posture. For example, the first position is a straight-on orientation.

According to another example, the computer 11 characterizes the location of the body part of the user in the first image. The body part may be centred, or decentred to the right, to the left, upwards or downwards in the first image. The location of said body part may be characterized with respect to a predetermined reference point in the first image, the centre for example, or with respect to a location of a positioning instruction displayed on the display screen 13, in particular a target 30. For example, the first position is a location centred in the image.

According to another example, the computer 11 characterizes the size of the body part of the user in the first image. The body part may occupy a larger or smaller area in the first image, or indeed be smaller or larger than a template displayed in superposition on the display screen 13. For example, the first position corresponds to a size substantially equal to the size of a template, the target 30 for example. The size may also be associated with a magnification factor of the video-capturing device 12. For example, the first position corresponds to a size when the magnification factor of the video-capturing device 12 is 100%.

In a characterizing step 102, the computer 11 determines a second position of said body part of the user different from the first position.

For example, the first position of a face is a straight-on orientation. The second position is a three-quarter orientation.

For example, the first position of a face is a location centred in an image. The second position is an off-centre location to the right in an image.

For example, the first position of a face is a face size in an image substantially equal to the size of a template displayed in superposition with said image on the display screen 13. The second position is a face size multiplied by a magnification factor of 150% with respect to the first position and said template.

In a processing step 103, the computer 11 retrieves a video stream of images containing the body part, the images having been acquired by the video-capturing device 12. As images are acquired by the video-capturing device 12, the computer 11 generates modified images by modifying the positioning in the acquired images of the body part 2. The modified images are displayed on the display screen 13, so as to display to the user 1 doctored video feedback of said body part 2.

For example, in each image of the video stream of images, the positioning of the body part 2 is modified to reflect a transformation such as enlarging or decreasing the size of the body part, decentring said body part, or rotating said body part.

For example, the same type of transformation is applied to all the images of the stream of images, in particular according to defined parameters.

The same type of transformation is applied to all the images of the stream of images.

In particular, the defined parameters are applied to all the images of the stream of images.

For example, for an enlarging or shrinking transformation, an enlargement- or shrinkage-factor parameter is determined and applied to all the images of the stream of images.

For example, for a decentring transformation, a decentring-factor parameter is determined and applied to all the images of the stream of images. A decentring factor for example comprises a translation achieved through changing the coordinate system in the image.

For example, for a rotating transformation, a rotation-angle parameter setting a rotation angle with respect to a rotation axis is determined and applied to all the images of the stream of images.

Thus, the computer 11 generates modified images corresponding to feedback that is doctored in that the positioning of the body part 2 does not correspond to the actual positioning of the body part, the doctored feedback being consistent in that a real relative movement of the body part with respect to the electronic device 10 is reproduced in the doctored feedback. For example, the body part is a head, and the user pivots his head about his neck to the right, from a first straight-on position with respect to the electronic device to a second left-profile position with respect to the electronic device. In the doctored feedback, the user pivots his head about his neck to the right, from a right-profile position with respect to the electronic device to a straight-on position with respect to the electronic device. The pivoting movement rightwards by a predetermined rotation angle is reproduced in the doctored feedback, the rotation angle being the same.

The display of the doctored video feedback encourages the user 1 to intuitively modify the position of the body part 2 to follow the predetermined positioning instruction.

The positioning is especially intuitive and natural because the user 1 does not know that the video feedback has been doctored or at least in what way it has been doctored. Believing the body part 2 to be incorrectly positioned, the user naturally modifies the position of said body part.

A visual or audio aid may additionally guide the user to comply with the predetermined positioning instruction, for example through display on the display screen 13 of arrows, colours, pictograms or messages, or through transmission of audio guidance messages indicating a movement direction or heading to be followed.

The user 1, to follow the predetermined positioning instruction for the body part 2 while looking at the display screen 13, performs a self-correction by modifying the positioning of said body part with respect to the electronic device 10, in order to tend towards a position in which the body part 2 is positioned according to the predetermined positioning instruction.

If the electronic device 10 is fixed, the user self-corrects the positioning of the body part 2 with respect to the electronic device 10 by moving said body part 2, and possibly by moving himself, but this is not mandatory. For example, a user may modify the position of his face by pivoting his head about his neck, without moving his chest and without moving. Alternatively, a user may turn on himself or turn around the electronic device 10 to modify the position of his face with respect to the electronic device such as above.

If the electronic device 10 is mobile, the user may self-correct the positioning of the body part by moving the body part 2, and possibly by moving himself and/or by moving the electronic device 10. For example, if the electronic device 10 is a mobile telephone that the user is holding in his hand, the user may modify the position of his face by pivoting his head about his neck, without moving his arm or hand, and while moving or remaining still. The user may also move his arm from right to left around his chest to modify the position of his face with respect to the electronic device 10 such as above.

During this processing step 103, the computer 11 modifies the images acquired by the video-capturing device 12 in such a way that a position of said body part 2 according to said predetermined positioning instruction on the display screen 13, and therefore in the modified images of the doctored video feedback, corresponds to a position of the body part 2 in the second position in an image acquired by the video-capturing device 12 and not modified by the computer 11.

The images are modified so that the movement of the body part 2 in the doctored video feedback displayed on the display screen 13 is consistent with the change in positioning of the body part 2 in the images acquired by the video-capturing device 12, i.e. consistent with the actual change in positioning of the body part 2 with respect to the electronic device 10. For example, a movement of the body part with respect to the electronic device 10 in one direction, for example to the right, engenders a movement of the body part in the same direction in the doctored video feedback, here to the right.

The images are modified so that the movement of the body part in the doctored video feedback displayed on the display screen 13 is continuous.

The images are modified so as to make the user 1 believe that he has mispositioned the body part with respect to the electronic device 10, with respect to the predetermined positioning instruction, and that a modification of the position of the body part with respect to the electronic device 10 is required to comply with said predetermined positioning instruction.

Advantageously, the environment of the body part is partially or completely replaced by a predetermined image background such as a background of solid colour. This means the computer 11 does not have to modify the environment of the body part in the images to ensure continuity and consistency of environment in the modified image. Thus, aberrations in the environment of the body part 2 in the modified image are avoided. A neutral background further makes it possible to highlight the body part 2 of the user 1. Only the body part 2 of the user 1 will then appear on the display screen 13, for example on a solid white or black background.

If the processing step 103 is not interrupted and the user 1 modifies the positioning of the body part 2 according to said predetermined positioning instruction, then, when the body part 2 is positioned according to said predetermined positioning instruction on the display screen 13, and therefore in the images modified by the computer 11, the body part 2 is positioned in the second position in the unmodified images such as acquired by the video-capturing device 12.

In a second acquiring step 104, the video-capturing device 12 acquires a second image containing said body part 2 of the user, during the processing step 103.

Thus, the imaging method makes it possible to acquire a second image of the body part of the user 1 the position of which corresponds to an intermediate or final position of the body part 2 on a predetermined movement from the first position to the second position.

Preferably, during the processing step 103, the video-capturing device 12 acquires a plurality of second images in the second acquiring step 104, the position of the body part in each second image being different.

Thus, during the processing step 103, the computer 11 modifies images acquired by the video-capturing device 12 as the acquisitions progress, certain of these acquired images being second images according to the second acquiring step 104.

A plurality of second images of the body part are acquired on the predetermined movement of the body part from the first position to the second position.

Advantageously, the position of the body part 2 in each second image is significantly different, so as to enrich a second image database.

For example, in the plurality of second images, the body part 2 is positioned with a plurality of orientations: straight on, at a one-quarter angle, at a three-quarter angle and sideways on.

For example, in the plurality of second images, the body part 2 is decentred to a greater or lesser extent: one quarter, one third, one half, two-thirds and three-quarters of the distance between the centre and an edge of the image.

For example, in the plurality of second images, the body part 2 is magnified by a different factor with respect to the first position: 110%, 120%, 130%, 140% and 150%.

Advantageously, the position of said body part in each second image is different from the second position.

Specifically, to be sure that the user 1 has positioned the body part 2 in a target position, it is advantageous for said target position to be chosen to be an intermediate position in a movement between the first position and a second position. Thus, if the user 1 has difficulties self-correcting the position of the body part 2 in order to reach with precision a position according to the predetermined instruction on the display screen 13, i.e. the second position in an unmodified image, the target position will still be reached during the self-correction movement because it is an intermediate position.

According to one embodiment, the processing step 103 terminates when the position of said body part in the second image corresponds to a predetermined third position different from the second position.

In the case of a second acquiring step 104 comprising acquiring a single second image, the body part is positioned in the third position in said single second image.

In the case of a second acquiring step 104 comprising acquiring a plurality of second images, the body part is positioned in the third position in the last second image of the plurality of second images.

The third position is advantageously the target position, such as described above.

According to another embodiment, the processing step 103 terminates when it is detected in a second image that other second images on the movement of the body part 2 between the first position and the second position will no longer be useful or advantageous to the electronic device 10 and/or to an auxiliary device such as an anti-fraud device or a device for performing three-dimensional modelling or for constructing biometric data.

For example, if a second image yields unexpected information, it may be appropriate to terminate the current movement of the body part 2 and to engender a different movement of the body part 2 by reiterating the imaging method with a new second position.

For example, if it appears in a second image that a head of a user does not have a left ear, it may be appropriate to make the head of the user turn to the left to verify whether the head has a right ear. This information may be of use to an anti-fraud device, to confirm a suspicion of fraud.

According to another embodiment, the processing step 103 terminates when the number of second images exceeds a predetermined threshold. In this case, it is not a particular target position that is the objective, but acquisition of images of the body part in different positions, during a predetermined movement, for example to verify the consistency of the movement with the predetermined instruction.

A predetermined threshold is for example between 2 and 6, and preferably equal to 5.

The second position results from at least one transformation among:
enlarging or decreasing the size of the body part in the first image,
decentring said body part in the first image,
rotating said body part in the first image.

The second position is chosen depending on the nature of the movement of the body part vis-à-vis the desired video-capturing device, but also on a heading, direction and magnitude.

A second position close to the first position induces a movement of small magnitude whereas a second position far in distance or very different in nature from the first position induces a movement of large magnitude.

The direction is for example diagonal, horizontal, vertical or defined by an angle with respect to a reference direction.

A heading is, for example, upwards, downwards, rightwards, leftwards or defined with respect to the cardinal points.

Its nature for example corresponds to a translation, to a rotation, or to a combination of a translation and a rotation.

A rotation is defined with respect to a rotation axis.

For a body part 2 that is a face, a planar rotation of a face seen straight-on in an image corresponds to an axial rotation of the face about an axis passing through the nose, this corresponding to a movement of inclination to the right or left of the head of a user holding himself vertically upright, for example standing or sitting.

An axial rotation of a face about an axis passing through the ears corresponds to a movement of inclination of the head of a user holding himself vertically upright, for example standing or sitting, upwards or downwards.

An axial rotation of a face about an axis passing through the neck corresponds to a rotational movement of the head of a user holding himself vertically upright, for example standing or sitting, to the left or to the right.

Figure 5A:
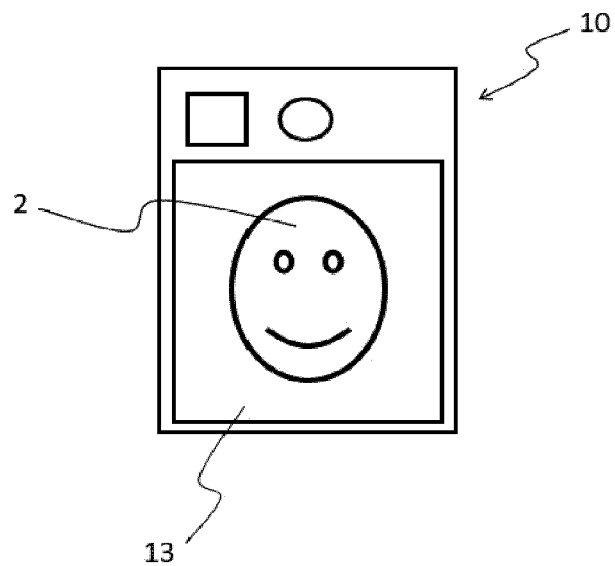
FIG. 5a shows an image of undoctored video feedback of the face of a user positioned according to a predetermined positioning instruction to centre the face on the screen.

FIG. 5a illustrates the undoctored video feedback of the face of a user 1 positioned according to a predetermined positioning instruction and in the manner of a standardized identity photo: whole face centred and straight-on. In the illustrated example, the first image is acquired while the face is positioned in this position, which corresponds to a first position, as shown in FIG. 5b.

Figure 5B:
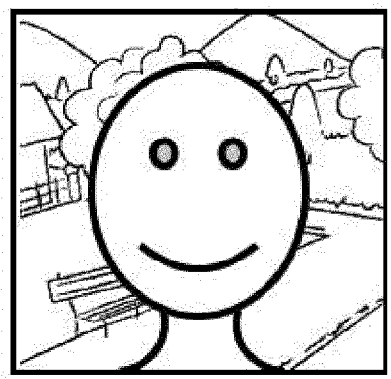
FIG. 5b shows a first image of a face in a first position.

FIG. 5b is an image acquired by the video-capturing device 12, the body part being positioned in the first position.

The user 1 is located in an outdoor space. FIG. 5b shows an environment of the body part 2, such as a park or garden.

In FIG. 5b, the first position is:
a straight-on orientation,
a location centred in the image,
a size corresponding to a magnification factor of 100% (or one) of the video-capturing device 1.

FIGS. 6a, 7a, 8a and 9a illustrate images of the body part 2 in a second position.

FIGS. 6b, 7b, 8b and 9b illustrate modified images of an image of the body part 2 positioned in the first position. These are therefore doctored-video-feedback images.

The images are modified by the computer 11 in such a way that, after self-correction by the user 1 of the positioning of said body part 2 according to the predetermined positioning instruction, here such as shown in FIG. 5a, the body part 2 is positioned in the second position.

Thus, FIGS. 6b, 7b, 8b and 9b illustrate the doctored video feedback of images that are modified versions of the image of FIG. 5b, which feedback is provided with a view to getting the body part 2 positioned in a second position shown in FIGS. 6a, 7a, 8a and 9a, respectively. Said second position will be reached when, on the display screen 13, the user 1 has positioned the body part 2 according to the predetermined positioning instruction, here such as shown in FIG. 5a.

As illustrated in FIGS. 6a to 9b, in all the modified images, the environment around the body part 2, here the face of the user, is advantageously replaced by a white background, so as to avoid aberrations in the environment of the body part, as already described above.

Advantageously, in the unmodified image of FIG. 5a, which is displayed on the display screen 13, the environment around the body part 2, here the face of the user, is also replaced by a white background, in order to prevent the user 1 from easily distinguishing doctored feedback from undoctored video feedback, or in any case in order not to give him any indication that video feedback has been doctored.

Instead of a white background, a black background (not shown) is particularly advantageous because it allows the attention of the user 1 to be drawn to the body part 2 displayed on the display screen 13.

Figure 6A:
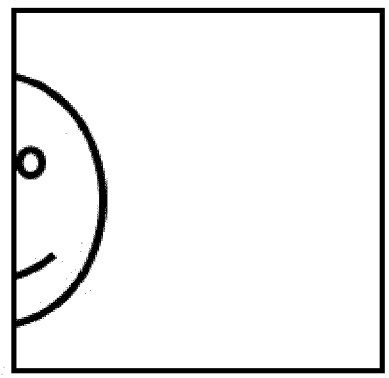
FIG. 6a shows an image of the face in a second position that is off-centre with respect to the first position.
Figure 6B:
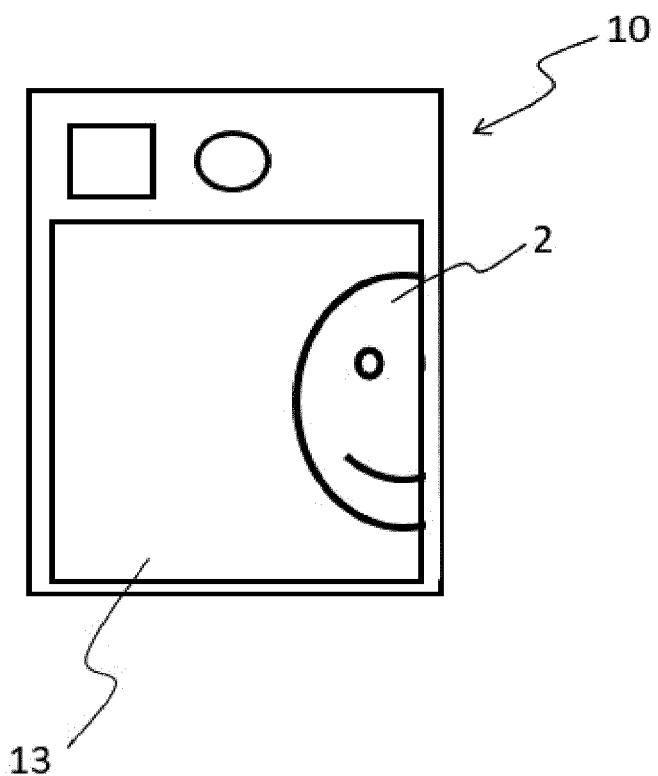
FIG. 6b shows an image of doctored video feedback of the face of the user positioned such as in FIG. 5b, after the position of the face has been modified in the image, by the computer, to reflect a decentring transformation.

In FIG. 6a, the second position is reached by decentring to the left the body part in the first image such as shown in FIG. 5b, i.e. through a change in positioning of said body part 2 from the first position and according to said predetermined positioning instruction corresponding to a movement of the body part 2 vis-à-vis the video-capturing device 12 in a plane orthogonal to a line of sight of said video-capturing device 12.

Figure 7A:
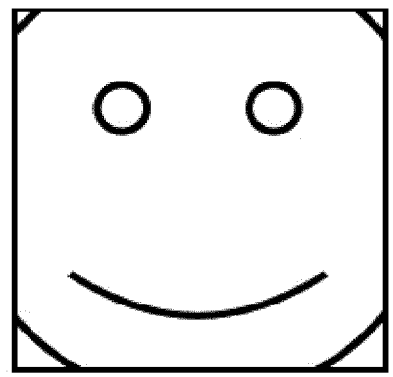
FIG. 7a shows an image of the face in a second position resulting, with respect to the first position, in an enlarged size.
Figure 7B:
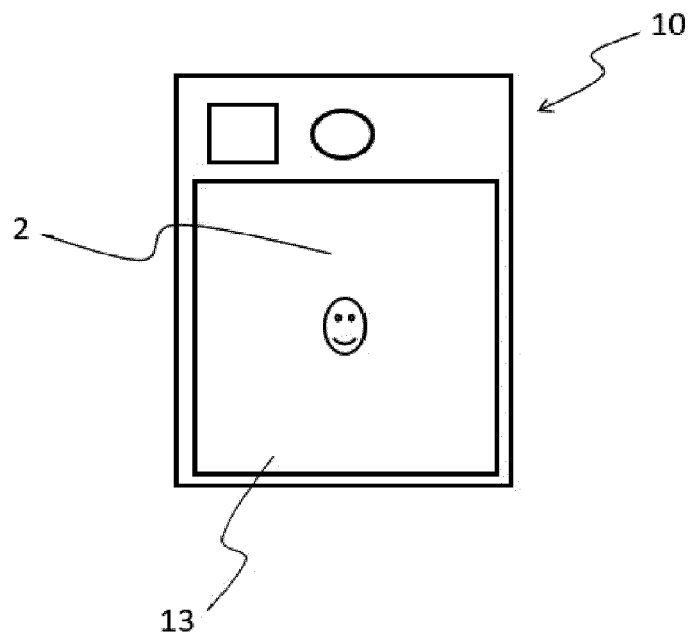
FIG. 7b shows an image of doctored video feedback of the face of the user positioned such as in FIG. 5b, after the position of the face has been modified in the image, by the computer, to reflect a shrinking transformation.

In FIG. 7a, the second position is reached by enlarging the size of the body part in the first image, i.e. through a change in positioning of said body part 2, from the first position and according to said predetermined positioning instruction corresponding to a movement of the body part 2 towards the video-capturing device 12.

Figure 8A:
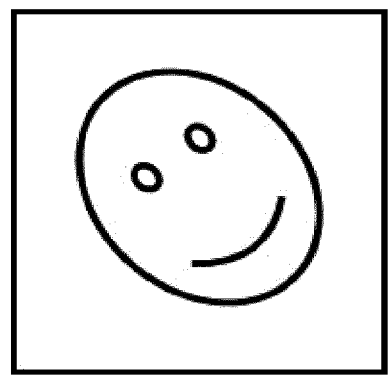
FIG. 8a shows an image of the face in a second position that is inclined to the left with respect to the first position.
Figure 8B:
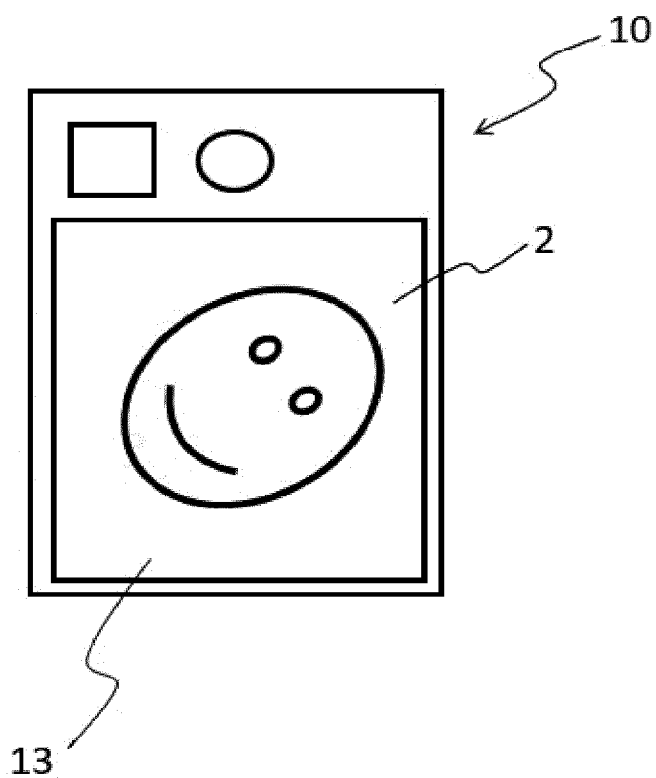
FIG. 8b shows an image of doctored video feedback of the face of the user positioned such as in FIG. 5b, after the position of the face has been modified in the image, by the computer, to reflect a transformation of planar rotation to the right.

In FIG. 8a, the second position is reached via a planar rotation to the left of said body part in the first image, i.e. through a change in positioning of said body part 2 from the first position and according to said predetermined positioning instruction corresponding to an inclination to the left of the body part vis-à-vis the video-capturing device 12.

Figure 9A:
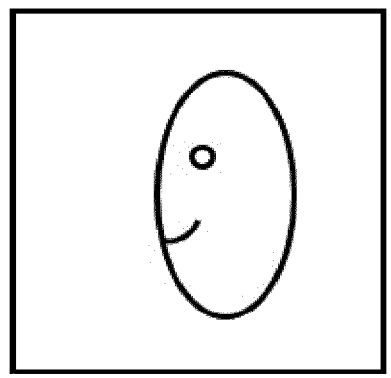
FIG. 9a shows an image of the face in a second position turned to the left with respect to the first position.
Figure 9B:
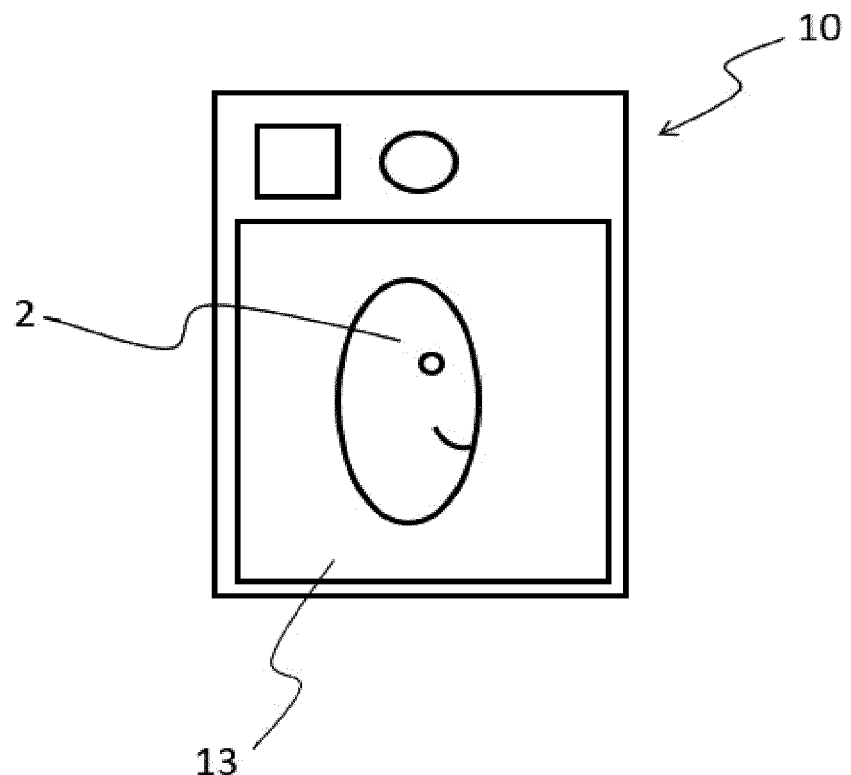
FIG. 9b shows an image of doctored video feedback of the face of the user positioned such as in FIG. 5b, after the position of the face has been modified in the image, by the computer, to reflect a transformation of axial rotation to the right.

In FIG. 9a, the second position is reached via an axial rotation to the left of the head, i.e. of said body part 2 in the first image, i.e. through a change in positioning of said body part 2, from the first position and according to said predetermined positioning instruction, corresponding to an axial rotation to the left of the body part vis-à-vis the video-capturing device 12.

In the case of a transformation consisting of an axial rotation, the computer 11 needs a three-dimensional model of a face, preferably that of the user 1, but this is not mandatory. A three-dimensional model of a face obtained from a database, and optionally corresponding to an actual face, may be used. A neural network may advantageously be used to modify the image.

The enlarging, size-decreasing and decentring transformations and the transformation consisting in a planar rotation do not require additional data. They correspond to magnification, cropping or rotation of an image.

The change in positioning of the body part 2 was described above with respect to the video-capturing device 12, this being equivalent to describing it with respect to the electronic device 10, the video-capturing device 12 being fastened to and integral with the electronic device 10.

The second position may be determined depending on an instruction from an anti-fraud device.

Specifically, an anti-fraud device may need to verify details of the skin of the user 1 to determine whether the body part 2 is real or whether it is an image or an artificial prosthesis. Thus, a second position corresponding to an enlargement in the size of the body part 2 in the first image will be advantageous.

In order to detect a fraud of a planar nature, the anti-fraud device will need to see said body part 2 in three dimensions. Thus, a second position corresponding to an axial rotation of the body part 2 in the first image will be advantageous.

To detect a fake environment of the body part, for example if the body part 2 is printed on a photograph, the anti-fraud device will need to make said body part 2 move with respect to the environment of said body part. Thus, a second position corresponding to decentring of the body part 2 in the first image will be advantageous. Even though, in the modified images, the body part 2 is on a predetermined background, the computer still has available to it the images acquired by the video-capturing device. If the body part 2 moves with respect to the electronic device 10 in a way that is inconsistent with the environment, fraud may be suspected.

Alternatively or in addition, the second position may be determined depending on a device for performing three-dimensional modelling.

A device for performing three-dimensional modelling requires images of the body part 2 from a plurality of different viewpoints in order to be able to construct a three-dimensional model of said body part 2. Thus, a second position corresponding to a non-planar rotation of the body part 2 in the first image will be advantageous.

Alternatively or in addition, the second position may be determined depending on a device for constructing biometric data, and in particular on a device for constructing images of biometric prints.

A device for constructing biometric data of an iris for example requires a detailed image of the iris of the user 1 to characterize its patterns. Thus, a second position corresponding to an enlargement in the size of the body part 2 in the first image will be advantageous.

In this case, the video-capturing device 12 is advantageously able to acquire images of biometric prints of said body part 2 of the user 1, the first image and at least one second image being images of biometric prints.

In the case where the body part is a finger, it may be appropriate to have the finger rotate to allow fingerprint biometric information to be supplemented with finger-edge biometric information, to obtain wrapped biometric information. Thus, a second position corresponding to a non-planar rotation of the body part 2 in the first image will be advantageous. Thus, the second position is determined depending on an instruction from an anti-fraud device and/or from a device for performing three-dimensional modelling and/or from a device for constructing biometric data, the one or more second images being sent after acquisition to the anti-fraud device and/or to the device for performing three-dimensional modelling and/or to the device for constructing biometric data.

Specifically, it may be advantageous to use the same imaging method to feed a plurality of ancillary devices with second images, such device for example including an anti-fraud device, a device for performing three-dimensional modelling and a device for constructing biometric data.

The electronic device 10 and the anti-fraud device, the device for performing three-dimensional modelling or the device for constructing biometric data may be separate.

Alternatively, the electronic device 10 may comprise an anti-fraud device, a device for performing three-dimensional modelling or a device for constructing biometric data. The controller 11 may be common to the devices, it for example comprising an anti-fraud algorithm, an algorithm for performing three-dimensional modelling or an algorithm for constructing biometric data.

For example, the same image may be used to construct a three-dimensional model of a body part, to construct a biometric datum such as an image of a biometric print with a view to authentication of the user, and to verify that the user is legitimate.

Alternatively or in addition, the second position may be determined depending on the category of said body part 2.

For example, a second position corresponding to a non-planar rotation of an iris in the first image is not very relevant to constructing biometric data of an iris.

It is also possible for the computer to determine the second position depending on a random or pseudo-random datum.

Thus, the second position and the associated self-correction movement are not predictable by the user 1.

Since the second position is associated with a movement of the body part 2 vis-à-vis the video-capturing device 12, the movement being characterized by a nature, a heading, a direction and a magnitude, the random or pseudo-random datum may be applied to the nature, heading, direction or magnitude or to a combination thereof.

Depending on the needs of the electronic device 10, and optionally indirectly of a device that is an anti-fraud device and/or a device for performing three-dimensional modelling and/or a device for constructing biometric data, the first acquiring step 100, characterizing step 101, determining step 102, processing step 103 and second acquiring step 104 may be iterated a plurality of times.

The second position of an iteration of the imaging method is determined depending on the position of said body part 2 in a second image in the preceding iteration or in the preceding iterations.

In the case of a plurality of second images, the second position of an iteration of the imaging method is determined depending on the position of said body part in a predetermined image of the plurality of second images, and in particular depending on a target position such as described above in the preceding iteration or in the preceding iterations.

According to one example of embodiment, the number of iterations of the imaging method is dependent on an instruction from an anti-fraud device, from a device for performing three-dimensional modelling and/or from a device for constructing biometric data.

For example, in a case where an anti-fraud device needs images of five positions of the body part 2 reached through four predetermined movements vis-à-vis the video-capturing device 12, the second acquiring step 104 of the imaging method comprises acquiring five second images, and the imaging method is iterated four times.

This example is applicable to the case of the device for performing three-dimensional modelling, and of the device for constructing biometric data, the values being chosen to illustrate the example and being non-limiting.

According to another example of embodiment, the number of iterations of the imaging method is dependent on the elapse of a predetermined length of time.

Advantageously, the predetermined positioning instruction remains the same in all the iterations of the imaging method.

Also advantageously, the iterations follow one after another without the user being aware, the user self-correcting or attempting to self-correct without interruption the position of the body part according to the predetermined positioning instruction.

Figure 10A:
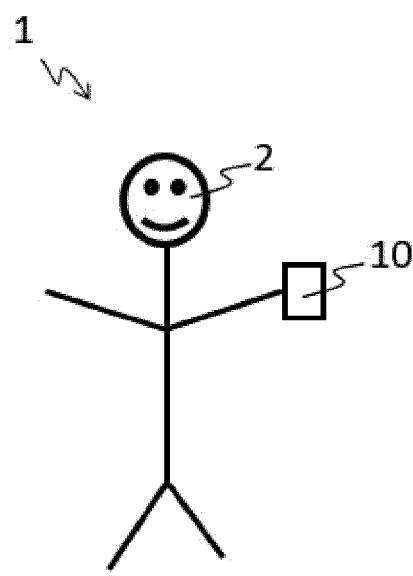
FIG. 10a shows a user holding a mobile electronic device in his hand before or at the start of execution of the imaging method according to the invention.
Figure 10B:
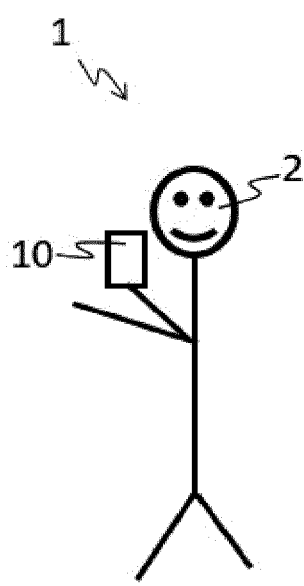
FIG. 10b shows the user of FIG. 10a self-correcting the position of his face following display of doctored video feedback on the display screen of the electronic device, according to execution of the imaging method according to the invention.

FIGS. 10*a* and 10*b* illustrate self-correction by a user 1 of the positioning of his face according to said predetermined positioning instruction, in the case of a mobile electronic device 10 such as a mobile telephone.

FIG. 10*a* shows the position of the electronic device 10 and of the user 1 prior to execution of the imaging method.

FIG. 10*b* shows the position of the electronic device 10 and of the user 1 after or during execution of the processing step 103 of the imaging method, the user moving his arm to move the electronic device 10 held in his hand to perform the placement self-correction.

Figure 11A:
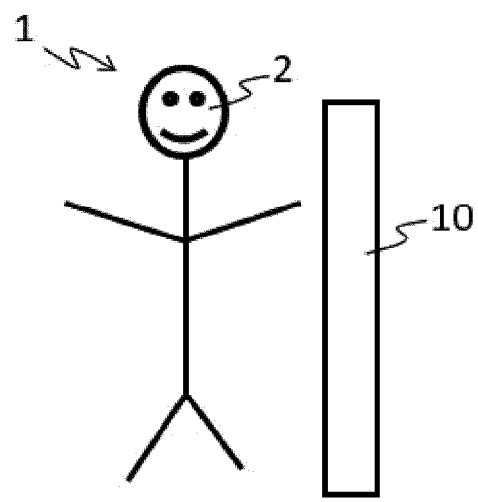
FIG. 11a shows a user in proximity to a fixed electronic device before or at the start of execution of the imaging method according to the invention.
Figure 11B:
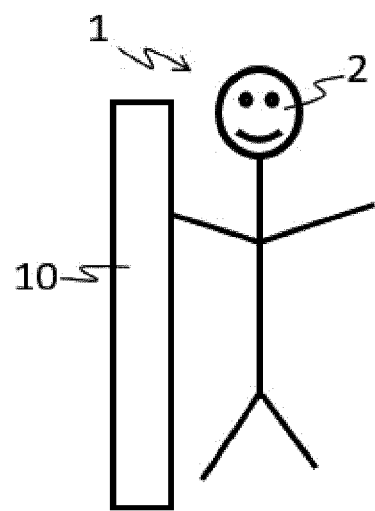
FIG. 11b shows the user of FIG. 11a self-correcting the position of his face following display of doctored video feedback on the display screen of the electronic device, according to execution of the imaging method according to the invention.

FIGS. 11*a* and 11*b* illustrate self-correction by a user 1 of the positioning of his face according to said predetermined positioning instruction, in the case of a fixed electronic device 10 such as a terminal.

FIG. 11*a* shows the position of the electronic device 10 and of the user 1 prior to execution of the imaging method.

FIG. 11*b* shows the position of the electronic device 10 and of the user 1 after or during execution of the processing step 103 of the imaging method, the user moving around the electronic device 10 to perform the placement self-correction.

In order to prevent the imaging method from being deceived by an illegitimate user replaying a previous execution of the imaging method, the invention also relates to an anti-replay method.

The anti-replay method comprises the imaging method described above, the second acquiring step 104 comprising acquiring a plurality of second images by means of the video-capturing device 12, and further comprises a verifying step 105 in which the computer 11 verifies that the self-correction of the positioning of said body part of the user according to said predetermined positioning instruction, by the user 1, is consistent.

The computer 11 verifies in the plurality of second images that the change in position of the body part 2 is consistent, depending on the first position and second position.

Advantageously, the computer 11 computes a consistency score.

By comparing the consistency score with a predetermined consistency threshold, the computer 11 determines whether the user 1 is attempting to commit fraud, for example by replaying a previous execution of the method or by playing a recorded video with the positioning of said body part changed randomly, or indeed whether he is not attempting to commit fraud.

If the computer 11 needs more data to generate a consolidated consistency score, the imaging method may be iterated a plurality of times. Thus, the computer 11 may verify the positional consistency of said body part of the user over a plurality of movements between a first position and a second position.

The verification of the consistency of a movement comprises verifying at least one parameter among:
- a movement direction,
- a movement heading,
- a movement magnitude,
- a type of movement, for example a rotation, a translation, an inclination, a tilting movement or a panning movement.

Similarly, the computer 11 may compute a probability of fraud and compare it with a predetermined fraud threshold.

The invention claimed is:

1. A method for imaging a body part of a user according to a predetermined positioning instruction by a system comprising a computer and an electronic device comprising a video-capturing device configured to acquire images of said body part of the user and a display screen, the method comprising the following steps:
- a first step of acquiring, by the video-capturing device, a first image containing said body part of the user,
- a step of characterizing, in said first image, by the computer, a first position of the body part of the user,
- a step of determining, by the computer, a second position of said body part of the user different from the first position,
- a processing step in which the computer retrieves a video stream of images acquired by the video-capturing device and containing said body part, generates modified images as the images of said video stream are acquired by modifying, in the acquired images, positioning of the body part, with a view to displaying, on the display screen, doctored video feedback corresponding to said modified images, so as to engender a self-correction by the user of the positioning of said body part according to said predetermined positioning instruction, the modification of the images being such that a position of said body part according to said predetermined positioning instruction on the display screen corresponds to a position of the body part according to said second position in an image acquired by the video-capturing device, and so that a movement of the body part in the doctored video feedback is consistent with a change in positioning of the body part in the acquired images, a movement of the body part with respect to the electronic device in a direction engendering a movement of the body part in the same direction in the doctored video feedback,
- a second step of acquiring, by the video-capturing device, a second image containing said body part of the user, during the processing step.

2. The method for imaging a body part according to claim 1, a position of said body part in the second image being different from the second position.

3. The method for imaging a body part according to claim 1, the second acquiring step comprising acquiring a plurality of second images by the video-capturing device, a position of the body part in each of the plurality of second images being different.

4. The method for imaging a body part according to claim 3, the processing step terminating when the position of said body part in one of the plurality of second images corresponds to a predetermined third position different from the second position.

5. The method for imaging a body part according to claim 3, the processing step terminating when a number of the plurality of second images exceeds a predetermined threshold.

6. The method for imaging a body part according to claim 3, further comprising an anti-replay method, for preventing replay of a movement of a body part, the anti-replay method comprising a step of verifying, by the computer, whether a self-correction by the user of the positioning of said body part of the user is consistent with said predetermined positioning instruction during the processing step, by verifying that a change in the position of the body part in the plurality of second images is consistent with the first position and the second position.

7. The method for imaging a body part according to claim 1, the second position resulting from at least one transformation among:
- enlarging or decreasing a size of the body part in the first image,
- decentring said body part in the first image,
- rotating said body part in the first image,
- a change in positioning of said body part from the first position and according to said predetermined positioning instruction corresponding to a predetermined movement of said body part vis-à-vis the video-capturing device, the predetermined movement being respectively at least one movement among:
  - a movement towards or away,
  - a movement in a plane orthogonal to a line of sight of said video-capturing device,
  - a rotary movement.

8. The method for imaging a body part according to claim 1, the predetermined instruction positioning of said body part of the user comprising displaying on the display screen, in superposition, a positioning target a location and size of which are set with respect to said display screen.

9. The method for imaging a body part according to claim 1, the second position being determined depending on an instruction from an anti-fraud device and/or from a device for performing three-dimensional modelling and/or from a device for constructing biometric data.

10. The method for imaging a body part according to claim 9, the second position being determined depending on a random or pseudo-random datum.

11. The method for imaging a body part according to claim 1, the first acquiring step,
the characterizing step, the determining step, the processing step, and the second acquiring step being iterated a plurality of times.

12. The method for imaging a body part according to claim 11, a second position of an iteration of the imaging method being determined depending on a position of said body part in the second image or in a predetermined second image of a plurality of second images of the second acquiring step in a preceding iteration of the imaging method, or on a history of positions of said body part in the second image or in a predetermined second image of a plurality of second images of the second acquiring step of preceding iterations of the imaging method.

13. The method for imaging a body part according to claim 11, the number of iterations being dependent on an instruction from an anti-fraud device and/or from a device for performing three-dimensional modelling and/or from a device for constructing biometric data, or indeed on elapse of a predetermined length of time.

14. The method for imaging a body part according to claim 1, said body part being a face.

15. A non-transitory computer program product comprising program instructions implementing the steps of the imaging method according to claim 1, when the program instructions are executed by a computer.

16. A system for imaging a body part of a user according to a predetermined positioning instruction, the system comprising:
- a computer; and
- an electronic device comprising a video-capturing device configured to acquire images of said body part of the user and a display screen,
wherein
the video-capturing device is configured to acquire a first image containing said body part of the user, the computer is configured to characterize, in said first image, a first position of the body part of the user, the computer is configured to determine a second position of said body part of the user different from the first position, the computer is configured to execute a processing step in which the computer retrieves a video stream of images acquired by the video-capturing device and containing said body part, generates modified images as the images of said video stream are acquired by modifying, in the acquired images, positioning of the body part, with a view to displaying, on the display screen, doctored video feedback corresponding to said modified images, so as to engender a self-correction by the user of the positioning of said body part according to said predetermined positioning instruction, the modification of the images being such that a position of said body part according to said predetermined positioning instruction on the display screen corresponds to a position of the body part according to said second position in an image acquired by the video-capturing device, and so that a movement of the body part in the doctored video feedback is consistent with a change in positioning of the body part in the acquired images, a movement of the body part with respect to the electronic device in a direction engendering a movement of the body part in the same direction in the doctored video feedback, and the video-capturing device is configured to acquire a second image containing said body part of the user, during the processing step.

\* \* \* \* \*